April 12, 1966  V. MILENKOVIC ET AL  3,246,223
SELECTIVE CONDITION LIMITING RECORDING SYSTEM
FOR A MOTOR CONTROLLED MACHINE TOOL
Filed May 3, 1962  5 Sheets-Sheet 1

Inventors
Veljko Milenkovic
George F. Bartimes
BY
Olson, Mecklenburger, von Holst,
Pendleton, & Neuman Attys

RESOLVER ROTATION

Inventors
Veljko Milenkovic
BY George F. Bartimes
Olson, Mecklenburger, von Holst,
Pendleton & Neuman Attys

Fig. 9

United States Patent Office 3,246,223
Patented Apr. 12, 1966

3,246,223
SELECTIVE CONDITION LIMITING RECORDING SYSTEM FOR A MOTOR CONTROLLED MACHINE TOOL
Veljko Milenkovic, Norridge, and George F. Bartimes, Chicago, Ill., assignors to American Machine & Foundry Company, a corporation of New Jersey
Filed May 3, 1962, Ser. No. 192,276
22 Claims. (Cl. 318—162)

This application relates to a system and apparatus for the selective control of various conditions, and one particular embodiment of the invention is directed to a system and apparatus for the control of position within a predetermined range with selective limit control within that range.

There are many systems in existence for the control of a variable through a servomechanism, feedback control system or the like, where control is initiated either manually or through predetermined automatic inputs. The condition is usually controlled within a predetermined range having limits, and throughout the range a known degree of resolution is available depending upon the mode of control and the magnitude of the range.

It is frequently desirable to accurately control the variable condition to one specific value or a plurality of specified values within the range. Frequently, the specified values are to be obtained in a predetermined and known sequence. Heretofore some systems have been known for controlling feedback systems and the like with a coarse, high speed system for large errors and a fine, low speed, low torque system for small errors. However, such systems were not related to absolute position but only to error signals and relative positions as compared to an input. Broadly, it is the purpose of the instant invention to provide a system and specific apparatus for accurately and quickly attaining a known sequence of predetermined conditions within a broader range of possible conditions of the equipment.

As will be seen from the following description many of the concepts of the instant invention have broad applicability. However, the invention will be particularly described hereinafter with respect to a machine for automatic work handling and work processing. The machine is described and claimed in the co-pending application of Johnson, Malenkovic and Walters, Serial No. 43,090 field July 15, 1960. The instant system and apparatus are especially useful with the machine described in the above-mentioned application, Serial No. 43,090, when utilizing the sequence control system which is disclosed and claimed in the application of Johnson and Malenkovic, Serial No. 129,074 filed August 3, 1961.

The machine described in said application No. 43,090 is a work handling machine especially designed for use with or between various work processing machines such as punch presses, and the like. The work handling machine has great flexibility and versatility in carrying out either simple or complex movements and operations. In its preferred form the machine operates in three basic modes and has three basic degrees of freedom. It has, in addition to the three basic degrees of freedom, three additional limited degrees of freedom whereby normal manipulative operations can be accomplished. The machine is capable of being programmed by the manipulation of a manual device which actuates servo valves in independent hydraulic systems for the three basic modes and the three limited modes. While guiding the machine through the program manually, two tape recordings are being generated which provide complete information for duplicating the manual program in a continuous multiple manner thereafter.

In utilizing the apparatus of application, Serial No. 43,090, with the sequence control system disclosed in application Serial No. 129,074, it has been found that programming at the optimum rate is difficult because of the human limitations at the point of precise positioning of the work handling arm. The operator who is programming the machine can move the arm rapidly over substantial distances, but as the arm approaches the critical points where a work piece is engaged or released, the human operator moves slowly and hesitatingly so that the program which is recorded has the same slow and hesitating motion at the critical positions of work piece engagement and discharge. This might be true also of other positions in the normal operating cycle where precision is required, such as holding the work piece under an operating machine and the like. Thus, typically in programming the apparatus there are portions of the cycle where an operator can drive the machine at approximately its optimum or maximum accelerations and velocities, while, in other portions of the program the machine is moving relatively slowly and is not fully utilizing machine capabilities.

Where an entire program is recorded at a slow but consistent and smooth rate, it is possible to accelerate the recording tapes to a fast time base on playback and thus increase the rate at which the entire cycle is repeated during automatic multiple operations. However, with the typical erratic programming which results from the need for precision at certain points in an operating cycle, one cannot increase the playback rate of the entire program to the point where the slower portions of the program are at optimum speed without exceeding the acceleration and power capabilities of the system during the simpler, more rapid portions of the cycle.

It is, therefore, one important object of this invention to increase the capabilities of condition control systems by providing accurate control to predetermine specific conditions within a broader range of conditions.

It is another object of this invention to provide selective condition control apparatus capable of injecting a series of condition limitations in the system in a predetermined sequence to program the system through a predetermined pattern of conditions with optimum speed and accuracy.

It is still another object of this invention to provide a system for selective position control within a broader range of positions in automatic work handling systems.

Another object of this invention is the provision of selective position control within a predetermined range of positions for a multiple mode work handling system in which condition limitations are sequentially inserted in the control apparatus for each or any of the modes of the system.

Anothe object of this invention is the creation of a system for the generation of imaginary or temporary limits or walls which control the possible range of movements of a movable manually controlled work handling device.

Another object of this invention is the provision of a sequence of limits or imaginary walls which are momentarily inserted in a manual control system whereby high positional accuracy is attainable at predetermined positions and at predetermined times whereby a manual program may be completed in optimum time.

Still a further object of this invention is the provision of an improved auxiliary system for a manually actuated work handling device whereby the human factors of hesitation, over-shooting, lack of precision, and the like, are minimized through the use of imaginary or temporary limits or walls within the range of positions which the manual device can assume.

Another object of this invention is the provision of electrical barriers in a fluid and electrical servomechanism system for positional control wherein the electrical barriers are temporarily and sequentially inserted in the system.

Another object of the invention is the provision of sequential limit or wall control of the position of a movable arm which has three degrees of freedom whereby a wide range of special positions can be attained with complete versatility.

A further and important object of this invention is the provision of automatic sequencing apparatus for producing a program of condition controls wherein a keyboard is employed for setting up predetermined conditions and automatically scanning all possible conditions to arrive at a selected condition in a predetermined and correct sequence or order.

Another object of the invention is the use of a single actuator switch to initiate or select one of a predetermined series of conditions by programming a keyboard and then scanning the conditions of said keyboard.

Another object of the invention is automatic apparatus to enable the selective use of manual control for a position control system, of automatic position control through the use of a singular position homing system, and of imaginary walls or limits in conjunction with the manual system.

Further and additional objects of this invention will become manifest from the following description, the attached claims and the drawings.

In one specific form of the invention, apparatus is provided for controlling the position of a movable element or arm which is capable of engaging and manipulating work pieces. The apparatus includes motive means for moving the arm in three specific degrees of freedom within a predetermined range of positions. The degrees of freedom are preferably horizontal, vertical and swing about a supporting column as described in application Serial No. 43,090. Manual means is provided for manipulating the arm to any desired position within the range, and means are provided for generating magnetic tape recordings of electrical signals representative of the pattern of movements dictated by the manual means. Thus, by merely applying the recorded signals to the machine, the program can be precisely repeated any number of times without the need for further manual control.

In application Serial No. 129,074 a homing system is described in which at the end of a manual program, a button is depressed and the arm automatically returns to a starting position called "home." This homing feature is important in that it provides a fixed datum position from which each cycle will begin and at which each cycle will end during automatic playback. This homing position can be quite accurately selected as it is created by electrical means prior to the commencement of the manual cycle and, thus, it is merely necessary to depress a button and the automatic homing condition is assumed. By making this "home" position one of the critical positions in the operating cycle such as the position in which the work piece is engaged or released, greater positional accuracy was assured as the machine would automatically assume that position by the shortest and quickest route without the aid or intercession of a manual operator.

The system described herein additionally provides a plurality of limit conditions which are selectively or sequentially applied to the system whereby the system does not automatically assume a predetermined or pre-selected position but the operator maintains control of the system within a more limited range of positions. Thus, by setting up a set of imaginary walls defining one or more positions of the system and sequentially utilizing those walls an operator may rapidly and with little caution or hesitation guide the work handling machine through a program, assuming the critical positions quickly and accurately with the aid of the walls or limits. The limits may be approached in any arbitrary manner from one side, but it is impossible to assume positions on the other side of the limit or wall value. Once a predetermined limit position has been attained, the operator will depress a selector button which will create a new set of limits and will permit completely versatile movement of the machine depending upon the new limit conditions. The limit conditions are pre-programmed by an operator who recognizes the required positions, the direction from which they are approached, and their sequence prior to actually performing an operation. Thereafter the sequence of limits are automatically inserted in the system by the depression of a single actuating button and the operation of a scanning selector system. For a more complete understanding of this invention, reference will be made to the accompanying drawings wherein:

For a more complete understanding of the invention, reference will now be made to the accompanying drawings and more particularly to FIG. 1, wherein a work handling machine 10 substantially like the machine disclosed in application Serial No. 43,090 is employed with a drill press 12. Work pieces 14 are fed to positions spaced from the drill press 12 such that the most advanced work piece 14a may be readily engaged by the jaws 16 which are disposed at the free end of a horizontal arm 18 forming the basic moving element of the work handling machine 10. The horizontal arm 18 is mounted in a carriage 22 which the main column 20 is in turn mounted on. The horizontal arm 18 is movable in the carriage 22 and is extensible to a point where the jaws 16 can engage the work piece 14a. The carriage 22 is free to move vertically on the column 20 in response to manual commands, and the column 22 is rotatable in the base 32 so that through the three modes of freedom, horizontal, vertical and swing, the jaws can be universally positioned within their range. All commands for vertical movement of the carriage 22 on the column 20, swinging movement of the column 20 about the base 32 of the machine 10 and horizontal extension of the arm 18 in the carriage 22 are dictated by an operator who manipulates the single manual control 24. A sensing switch 26 determines the proper positioning of the most advanced work piece 14a, and a program limit switch 28 determines that the drill press 12 is in proper synchronism with the work handling machine 10 so that the parts may be fed in synchronism.

The horizontal, vertical and swinging movements described above constitute the three basic degrees of freedom of the work handling machine 10. In addition to these, the jaws 16 are capable of opening and closing, turning together about a vertical axis of head 30 and also rotating with head 30 about the axis of arm 18. These limited modes of operation are also controlled by the operator in accordance with a predetermined sequence. The various operations may be either initiated through the depression of specific push buttons related to each operation as described in application Serial No. 129,074; or in a preferred form of the invention, the sequence of the various operations, such as opening and closing the jaw, twisting the jaws about the two axes or checking the condition of the drill press or the presence of work pieces can all be handled through pre-programming in a keyboard and stepping system, as will be described and then employing a single actuating push button.

The machine operates in all of its modes through hydraulic systems which are electrically controlled through servo valves. The necessary hydraulic mechanism is contained on the base 32 of the machine 10 and will not be described in any detail herein. Signals from the three differential transformers mounted in appropriate gimbals and driven by manual programmer 24 are fed in three separate circuits through a cable 34 to an electronic system 36 where they are translated into D.C. control voltages and fed back through separate conductors in cable 34 to the servo valves contained on the base 32. These in turn mechanically actuate the machine through hydraulic cylinders or equivalent motive means. At the same time, if the operator wishes to make a permanent record of the program for subsequent automatic repetition, the tape recorders 38 are energized through cable 39 from the electronic system 36 with a signal uniquely characteristic of the pattern of movement of the machine in the three basic modes. Separate resolvers on the machine provide unique signals describing the movement in the three modes, and these signals are applied through the electronics system to the recorder 38. This is done in three separate channels on the tape recorders, and a fourth channel is provided for the recording of signal information based upon the desire to actuate the machine in the limited modes or to program signals indicating the end of a sequence of operations, a check point for synchronism of the drill press 12, or a check for the presence of a work piece at the position 14A. All of this is set forth in the co-pending application, Serial No. 129,074.

A 10 kilocycle basic oscillator 40 is utilized to energize the resolvers which generate the signals for the homing and limit system of this invention and also to energize the differential transformers which are employed to actuate the servo valves and thus drive the hydraulic systems of machine 10. The sequence system 42 sorts the various signals from the synchronizing check switch 28, the work piece switch 26 and the electronic system to control the operation of the tape recorders. The sequence control system also determines whether the apparatus is in simple manual operation, in a recording condition, in condition for a single playback or set for continuous multiple playback operation. As the instant invention is utilized as an aid in programming, it will be assumed that the sequence control is set for recording and will not be discussed in any greater detail. In the preferred embodiment of the invention described in application Serial No. 129,074, two tape recorders are employed, and during programming or recording the manual program is recorded on the two tapes simultaneously. Then during playback the two tapes are run sequentially, and one is rewound while the other is actuating the machine, as determined by the sequence control system 42. Thus, continuous uninterrupted playback is possible.

If, for some reason, the work handling machine 10 is not synchronized with the work processing machine 12, this is indicated by the comparison of a signal controlled by switch 28 with a signal recorded on the tape recorders 38, and the machine 10 is automatically locked in position by the sequence control 42 until synchronism is reestablished. In a somewhat similar manner, if the sensing device 26 indicates at a predetermined point in the cycle of machine 10 that the next subsequent work piece 14a is not ready to be engaged by jaws 16, then again operation of the machine 10 is suspended and the system locked in a predetermined position by sequence system 42 until the work piece 14a is in position at which time the machine automatically recommences its operation.

To generate a permanent record of the progrm or sequence of machine manipulations, an operator must manually actuate lever 24 guiding the jaws into the desired positions. Thereafter, he must manipulate a switch which will automatically rotate the jaws as required to align with the work piece and close the jaws to engage the work piece 14a. The operator would then continue manipulating lever 24 to position the work piece in the jig 44 on drill press 12 after which the drill press would automatically perform the selected operation. In a typical cycle, the operator would then again pick up the work piece with the jaws 16 and deposit the work piece in a receptacle or outgoing conveyor. As is apparent, during the manual and recording sequences the operator can rapidly program the machine 10 from a starting position to about the position where the jaws will engage the work piece 14a. However, to precisely position the jaws with the system heretofore used, great care is necessary in approaching the work piece and in accurately positioning the jaws before they are actuated to engage the work piece. Thereafter, the jaws may be rapidly moved to approximately the position where the jaws deposit the work piece 14a in the jig 44. However, to actually place the work piece 14a in the jig 44 again requires slow and careful manipulation by the operator. This final motion is usually slow, hesitating and uneven. Thereafter, the operator must again program the machine 10 to place the work piece 14a in the outgoing receptacle. This too may require substantial precision resulting in a portion of the cycle which is slow and faltering.

Once such a program is recorded by tape recorder 38, there is no easy way to accelerate the time base or in other respects improve the operating cycle. Thus, the machine may fail to perform its assigned tasks in the optimum time or with the optimum efficiency. To overcome this problem, the instant invention provides a system and apparatus for multiple limit control wherein imaginary limits or walls are sequentially applied to the system by electrical means whereby the motion of the jaws 16 is limited and the operator may rapidly and without hesitation approach these limits. The system includes a limit control box 46, a gate 230, and additional circuitry contained on the base of machine 10. All of which is illustrated and will be described in detail with respect to FIGS. 3 and 4. Generally speaking, all stick signals from manual control 24, homing signals, and limit signals from limit control box 46 are applied to gate 230 which is electrically biased to pass only the appropriate signals. An additional set of resolvers is mounted on the machine 10 to generate signals for use in homing and limit control.

Figure 9:
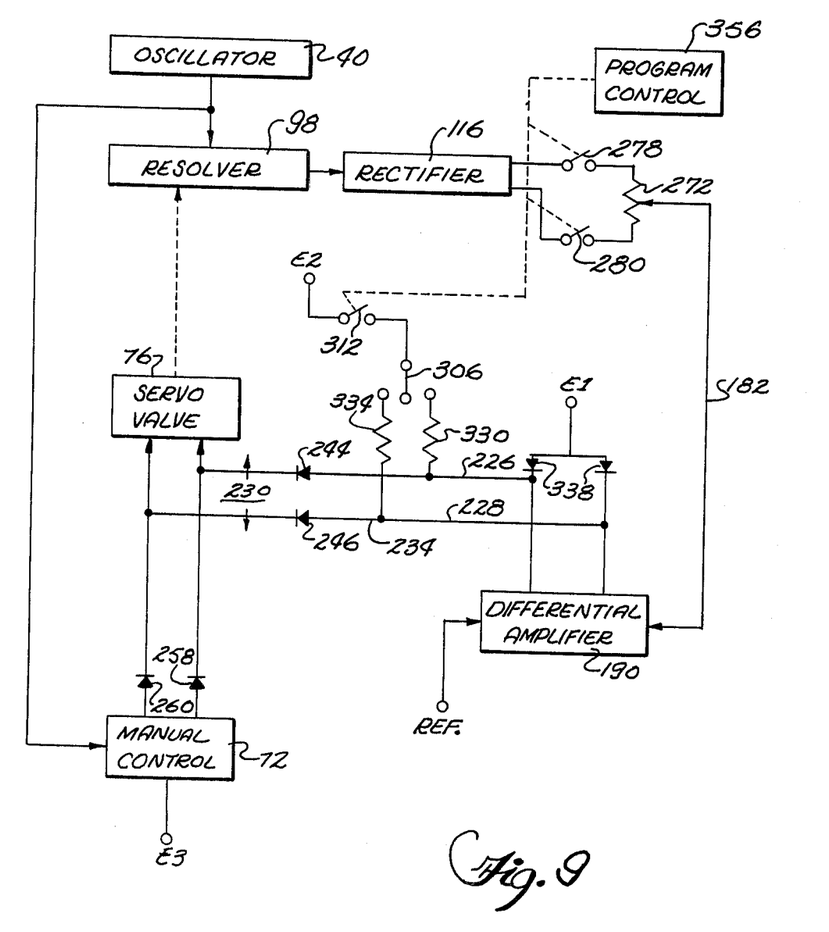
FIG. 9 is a schematic block diagram of a simplified form of the invention.

Referring now to FIG. 9, the theory of operation of a simplified form of the present invention will be described. The position of a movable element within the apparatus to be controlled is responsive to a voltage applied to a servo valve 76 which energizes a servo to effect a mechanical movement of the movable element. The position of the element is sensed by the output of a resolver 98, powered by an oscillator 40, which resolver provides an output signal in response to the position of the movable element. The output of the resolver 98 is rectified in a rectifier 116 to produce a D.C. signal proportional to the output of the resolver 98 which, in turn, is indicative of the position of the movable machine element. The output of the rectifier 116 is applied across the two end terminals of a potentiometer 272, by way of switches 278 and 280. The potential present at the tap of the potentiometer 272 is responsive to the output of the resolver 98 in accordance with the position of the movable element, and also to the relative position of the tap of the potentiometer 272. The tap of the potentiometer 272 is connected via a line 182 to one input of a differential amplifier 190, which has its other input connected to a reference potential, thereby to cause the output of the differential amplifier on lines 226 and 228 to vary inversely, respectively, in response to a varying potential applied to its input from the line 182. Power to render the differential amplifier 190 operative is derived from a source of potential $E_1$ via diodes 338.

A second source of potential $E_2$, which is greater than $E_1$, is connected to the line 226 by way of switch 312, another switch 306, and a resistor 330. The source $E_2$ may be selectively connected to the other output line 228 of the differential amplifier 190 through the switch 306 and a resistor 334, or to neither of the lines 226 and 228, in accordance with the position of the switch 306. The function of the two sources of potential $E_1$ and $E_2$, with their associated circuits will be described hereinafter.

The output of the differential amplifier 190 is applied to a gate 230 from which a signal is derived to actuate the servo valve 76 for movement of the movable element.

The manual control apparatus 72 is powered by the oscillator 40 and is provided with a pair of output terminals connected by diodes 258 and 260 to the gate 230. The output of the manual control apparatus 72 is biased at a predetermined voltage $E_3$, which is intermediate the values of $E_1$ and $E_2$.

A program control unit 356 is operatively connected to control the opening and closing of the switches 312, 278 and 280 in accordance with a predetermined sequence of program operations.

The apparatus functions in one of two modes of control. In the first mode, one of the switches 306 or 312 is open, while the switches 278 and 280 may be either opened or closed. If the switches 278 and 280 are open, there is no input applied to the differential amplifier 190 on the line 182 and hence the differential amplifier does not apply a control signal to the gate 230. If the switches 278 and 280 are closed, an output will occur on the output lines 226 and 228 of the differential amplifier 190, but will not be effective to control the gate 230 because the diodes 244 and 246 of the gate 230 are back-biased, since the voltage source $E_1$ is not as high as a bias voltage $E_3$ applied to the manual control 72. The diodes 258 and 260 are forward biased, however, and therefore the manual control apparatus 72 is effective to control the input to the servo valve 76. This results in a mode of machine operation in which the movable element of the machine is entirely responsive to the output signal of the manual control device 72, and no feedback loop exists within the system.

In the second mode of control, the movements of the movable machine element are limited in accordance with the position of the slider on the potentiometer 272 and the position of the switch 306. This mode of control exists when the switch 312 is closed and the switch 306 is operated to connect the voltage source $E_2$ to one of the resistors 330 or 334. In addition, the switches 278 and 280 are closed to apply the output of the rectifier 116 across the potentiometer 272.

The voltage source $E_2$ is thus connected by way of switches 312 and 306 and one of the resistors 330 and 334 to one of the output lines 226 and 228 of the differential amplifier 190. As the voltage source $E_2$ is higher in potential than the source $E_1$, one of the diodes 338 is back-biased, and the selected output line 226 or 228 of the differential amplifier 190 is elevated to a higher potential.

The movements of the movable machine element may be controlled by the manual control device 72 by way of the gate 230 and the servo valve 76 just as before. The output of the resolver 98, however, is connected by way of the rectifier 116, the potentiometer 272 and the line 182 to the differential amplifier 190 so as to cause one of the output lines 226 and 228 to increase its potential in response to the element moving in one direction while the other output line decreases its potential.

Assume that the switch 306 is actuated to connect the resistor 330 to the source $E_2$, and that the manual control 72 is operated to raise the potential of the output connected through the diode 258 and lower the potential of the output connected through the diode 260. The servo valve 76 then moves the movable element such as to produce an output condition of the differential amplifier 190 in which the potential on the output line 226 decreases and that on the output line 228 increases. The increasing potential on the line 228 is not sufficient to overcome the back bias on the diode 246, while the decreasing potential on the line 226 renders the diode 244 back-biased also, and the operation is therefore the same as if the switch 312 were open.

If, however, the manual control is operated to produce movement of the movable element in the opposite direction by lowering the potential applied to the diode 258 and raising the potential applied to the diode 260, the machine motion causes the potential on the line 226 to rise and that on 228 to fall. Thus, the diode 246 is back-biased further, but the diode 244 becomes forward-biased, and further movement of the movable element raises the potential on the line 226 sufficiently to compensate for the elevated potential applied to the diode 260 by the manual control device 72. Thus, the inputs to the servo valve 76 are effectively balanced when the movable element has reached a predetermined position. The location of this position depends upon the position of the tap of the potentiometer 272.

The operation of the gate 230 is to compare first and second outputs of the differential amplifier 190 with corresponding outputs of the manual control, and to apply the difference between the higher of the first outputs from the differential amplifier and the manual control, and the higher of the second outputs from these units to the servo valve 76. The imaginary wall is encountered when the higher of the two outputs from the manual control device 72 is equal in amplitude to the higher of the two outputs from the differential amplifier 190. As the output of the differential amplifier 190 is dependent upon the value of its input, which is controlled by the position of the slider potentiometer 272, the position of the wall may be adjusted by adjusting the potentiometer 272.

It will be appreciated that if the switch 306 is operated to connect the other one of the resistors 330 and 334 to the source $E_2$, the opposite output of the differential amplifier 190 is energized to permit manual control only on the other side of the imaginary wall. Hence, the position of the switch 306 controls the sign of the limiting condition, while the position of the potentiometer 272 controls its amplitude, or position.

The apparatus illustrated in FIG. 9 has a somewhat simplified form of one embodiment of the present invention in that only movement in one rectilinear dimension is affected thereby. In the preferred embodiment, however, a set of three of such imaginary walls are employed, as will now be described.

Figure 2:
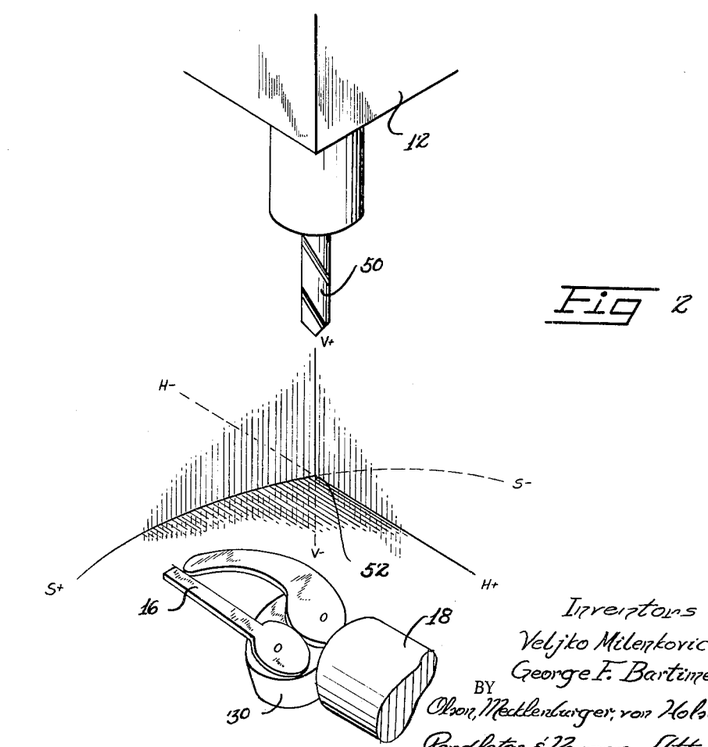
FIG. 2 is a fanciful view of the three imaginary walls created in the described embodiment of this invention.

FIG. 2 illustrates one particular set of imaginary walls which might be employed with the instant invention. The jaws 16 supported in the wrist 30 at the free end of horizontal arm 18 are diagrammatically shown in spaced relationship from the central axis of a drill bit 50 which forms the tool of drill press 12. As is well understood, the drill press is designed to move the drill 50 along a substantially vertical axis as the drill 50 is rotated about its own axis. As already described, the jaws 16 carried by the horizontal arm 18 are capable of movement with three basic degrees of freedom. The arm is free to rotate with its supporting column 20 about the column axis, and this is described as the swing axis. The swing movement is indicated in FIG. 2 by the arcuate line S—S. The horizontal arm 18 is also capable of horizontal movement within the carriage 22, and this horizontal movement is indicated by the axis H—H in FIG. 2. The carriage 22 moves vertically on the column 20, and this vertical movement is indicated in FIG. 2 by the axis V—V. These axes as shown in FIG. 2 are generally orthogonally oriented with their apex on the axis of drill bit 50. Thus, for diagrammatic purposes, it will be assumed that the jaws should move from a remote position in one of the octants to the apex of the three axes to accurately position the work piece with respect thereto. It will, of course, be obvious that the precise location of the apex which is the desired limit position of the jaws 16 may be displaced somewhat from the axis of the drill bit 50 depending upon the manner in which the jaws 16 engage the work piece 14a and the particular point on the work piece 14a where the drill press must operate, and the walls shown are for illustrative purposes only.

A plane is defined by the intersection of the axes H—H and V—V, and this plane constitutes the wall in the swing axis so that as the operator attempts to program the machine 10 in such a manner that the arm 18 moves through the imaginary wall defined by the intersection of axes V—V and H—H, the electronic system of the limit control apparatus generates an electrical signal which prevents movement of the arm 18 through the swing wall. A similar plane is defined by the intersection of the axes H—H and S—S, and this constitutes a wall for the vertical mode of operation such that an operator cannot move the arm 18 vertically on column 20 through the imaginary wall as an electrical signal is generated as the arm approaches the wall which prevents actuation of the hydraulic system in such a manner that the arm would traverse the wall. A third and somewhat similar imaginary limit or wall is defined by the intersection of the S—S and the V—V axes. This cylindrical wall is designed to limit horizontal actuation of arm 18 in carriage 22 such that an operator cannot move the jaws 16 outwardly from the column 20 in such a manner that the jaws would pass through the imaginary limit wall. All of the foregoing discussion has assumed that the jaws 16 are in the octant which is in the foreground in FIG. 2 and that the three walls define an apex for that octant so that if an operator urges the manual control 24 through the apex or in such a manner that the jaws would move through the apex, then the jaws will automatically assume the desired position so that the work piece is located at the apex. By the simple manipulation of polarity reversing switches in each or any of the three modes, horizontal, vertical and swing, it is possible to approach the apex 52 from any one of the eight octants. This will become more obvious from a consideration of the specific circuit diagrams which follow.

Figure 1:
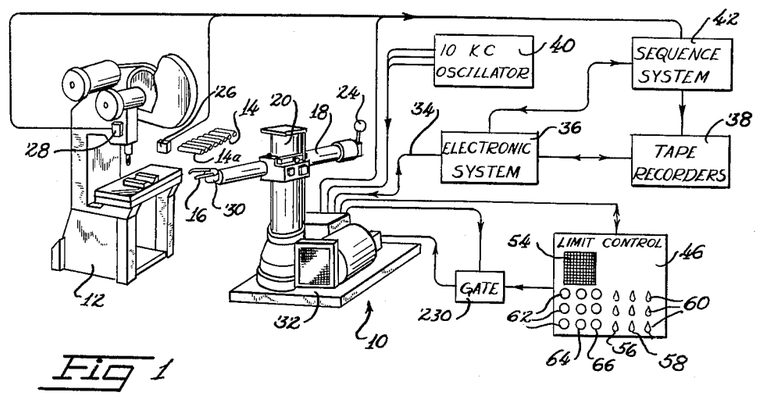
FIG. 1 is a simplified diagrammatic view of a work processing machine, a work handling machine, the basic elements of a machine control system, and a diagrammatic view of the limit control system of the instant invention.
Figure 4:
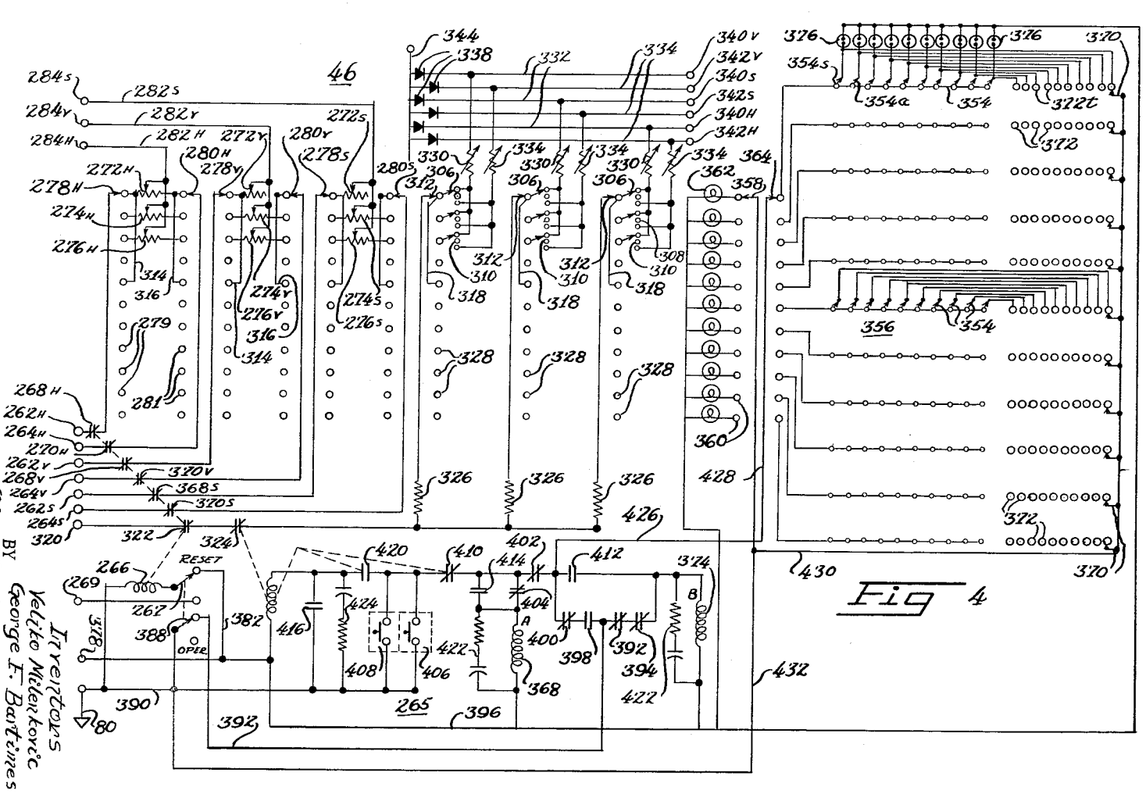
FIG. 4 is representative of the circuitry contained within the limit control box of FIG. 3.

The limit control box 46 of FIG. 1 includes a keyboard 54 whereby any desired sequence of limit controls may be inserted in the system by merely depressing the appropriate push buttons which in turn control the switch matrix 356 to be described with respect to FIG. 4. Switch levers 56, 58 and 60 control three position switches 306, 308 and 310 of FIG. 4 which provide for polarity reversal in each of the three modes. In the upper position, the wall of the particular mode must be approached from the positive side thereof. In the lower position, the wall of the given mode must be approached from the negative side and, in the central position, complete freedom of motion in that mode is available throughout the range of the equipment, and no imaginary walls exist. The column of switch levers 56 controls the vertical wall; the column of levers 58, the swing wall; and the column of levers 60, the horizontal wall. Knobs 62, 64 and 66 control potentiometers 274, 276 and 278 of FIG. 4 and determine the precise location of the walls within the range of available movement of the arm in each of the three basic modes, respectively. This will become obvious from the description of the circuit elements.

Figure 3:
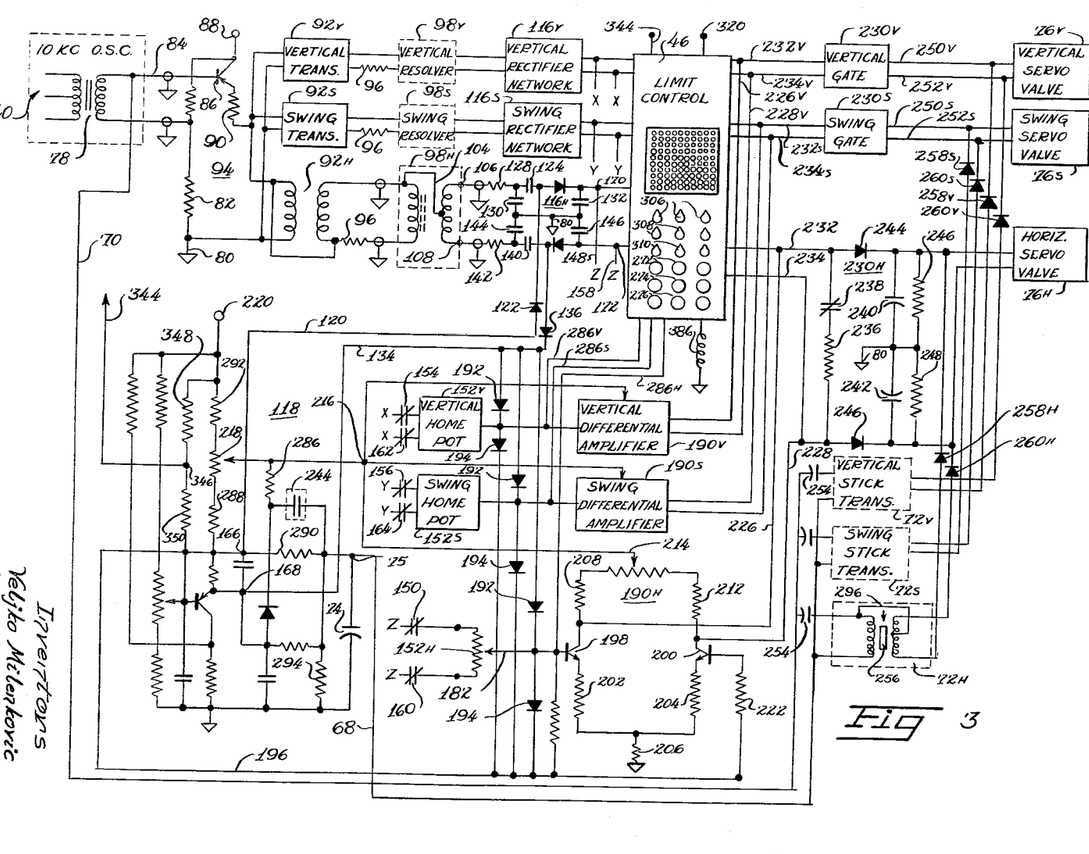
FIG. 3 is a circuit diagram partly in block form of the described embodiment of the invention.

Referring now to FIG. 3, the complete limit control system is shown partially in block form and partially in detailed circuitry. The 10 kilocycle oscillator 40 energizes the three separate channels for the vertical, swing, and horizontal modes of operation. The vertical and swing channels are shown principally in block form while the detailed circuits are included for the horizontal mode. Most of the components for the three modes are shown connected seriatim across the top of the sheet, FIG. 3, with the other important associated circuits shown therebelow. Each of the three channels across the top is energized from the output transformer 78 of 10 kc. oscillator 40 and includes a transformer 92, a resolver 98, a rectifier network 116, a portion of the limit control box 46, a gate 230 and a servo valve system 76. Also associated with each of the three channels and shown at the bottom of FIG. 3 are a homing potentiometer 152, a differential amplifier 190, and a manual or stick controlled differential transformer 72. At the lower left corner of FIG. 3 a network 118 is illustrated which is merely a voltage dividing and stabilizing network which provides the several critical voltage levels required for proper operation of the entire system.

The three manually controlled differential transformers 72 are energized with a 10 kc. signal from transformer 40 through conductor 70, isolating capacitors 254 and return conductor 68 which returns to ground through capacitor 74 in supply network 118. Differential transformers 72 have output windings which are applied through diodes 258 and 260 to amplifiers forming a part of the corresponding servo valves 76. A D.C. reference is provided from point 75 in the network 118 through conductor 68, the primary of differential transformer 72, conductor 296, diodes 258 and 260 and resistors 246 and 248 to the system ground 80.

The 10 kilocycle oscillator is not illustrated in its entirety but only as an output transformer 78 as shown in FIG. 3. The secondary winding of transformer 78 is connected to the ground reference 80 through an appropriate resistor 82. The other terminal of the secondary of the transformer 78 is connected through a shielded conductor 84 to the base of a PNP transistor 86 which is connected in a conventional common collector amplifier circuit 94. The collector is connected to a source of negative voltage 88 and the emitter is connected through an emitter resistor 90 to the primary winding 92 of three transformers 92 connected in parallel and including vertical transformer 92V, swing transformer 92S and horizontal transformer 92H. The transistor amplifier stage 94 is to provide sufficient power to drive the three transformers 92V, 92S and 92H and is also adapted to isolate the transformers and the three independent channels from the 10 kilocycle oscillator.

The ungrounded terminal of the primary winding of each of the three transformers 92 is connected to the opposite terminal of the secondary winding whereby additional voltage gain is provided. By virtue of the series resistors 96, the outputs of transformers 92 are coupled through shielded conductors to the primary windings of resolvers 98V, 98S and 98H. The resolvers are installed directly on the machine 10 in a manner descibed in application Serial No. 129,074 and are so designed that full travel within the range of a given mode results in 180° of rotation of the resolver shaft; that is, for the complete available swing of the column 20 on the base 32, the swing resolver 98S is driven through 180° or one-half revolution. Similarly for the complete vertical travel of which carriage 22 is capable on column 20, the vertical resolver 98V is driven through 180°; and for the complete horizontal travel of arm 18 within carriage 22, the horizontal resolver 98H is driven through 180°.

Figure 5:
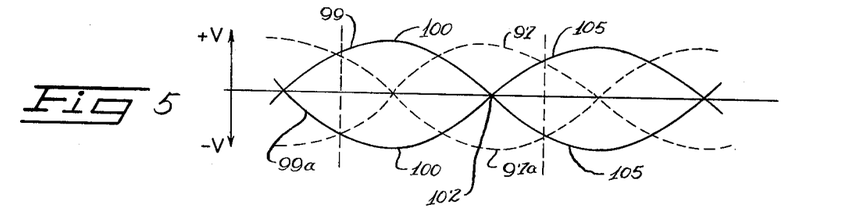
FIG. 5 is a chart of resolver output voltage versus position.

One of the outputs of each of the resolvers 98V, 98S and 98H for movement of the corresponding mechanical element is illustrated by solid lines 99 in FIG. 5. This is a typical output curve for one winding of a resolver in which the coupling between the primary and secondary windings varies with the angular orientation of those windings in such a manner that when the windings are normal, the output is substantially zero, and when the windings are parallel, the output is at a maximum. A second winding physically mounted normal to the first has an identical output envelope except that it is shifted through a rotational angle of 90° as shown by broken lines 97. Thus, as the resolver is rotated, its two outputs define envelopes as shown in FIG. 5 where the abscissa represents resolver rotation and the ordinate represents the secondary voltage varying for any angle between equal positive and negative voltage values. As the coupling is increased, the envelope increases in size to a maximum at point 100 on the curve, and thereafter as the coupling decreases, the envelope decreases to a point where the two windings are normal, and thus, the secondary voltage drops to zero as indicated by point 102 in the chart of FIG. 5.

Further rotation produces increasing voltage 105 in the winding but there has been a 180° phase reversal.

A conductor 104 interconnects the ungrounded side of the primary of each of the resolvers 98 with a center tap on the secondary thereof. By virtue of this connection 104, a fixed magnitude A.C. bias is produced which adds to the secondary winding voltages and shifts the voltage so that one half of the voltage envelope 99 has the configuration 112 shown in FIG. 6 while one half of the voltage envelope 97 has the configuration 114 in FIG. 6.

Figure 6:
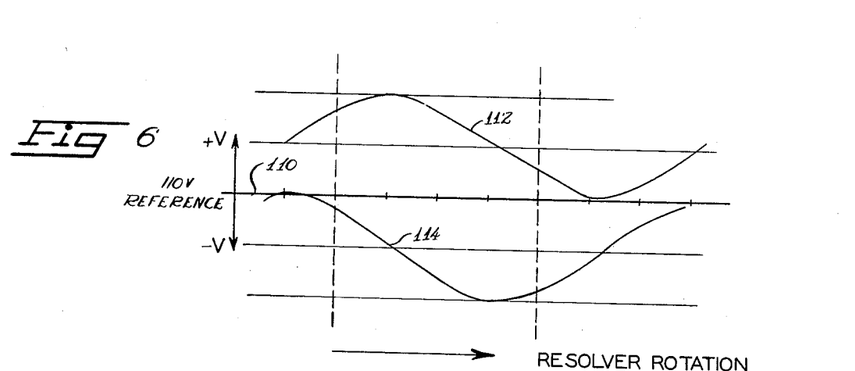
FIG. 6 is a chart of the phase shifted resolver output which appears at one point in the circuitry of FIG. 3.

Thus, the outputs at terminals 106 and 108 of the resolver secondary are derived from a 10,000 cycle signal from the oscillator 40 which has been amplified in the transistor amplifier 94 and applied to the resolvers 98 in such a manner that the amplitude of the 10,000 cycle signal varies as shown in FIG. 5 between a zero value when the primary and secondary windings are normally disposed and a maximum value when the primary and secondary windings are substantially parallel thus experiencing maximum coupling. As a result of the direct coupling through conductor 104, the primary voltage is applied in series to each half of the secondary voltage and because of the additive nature of the winding and the 180° phase shift in the voltages appearing in the two output windings in the second and third quadrants. Thus, with respect to a fixed potential in the system such as the system ground or the substantial positive reference voltage which is available from the supply network 118, the wave shape and rotational relationship of the voltages appearing at terminals 106 and 108 are as illustrated in FIG. 6 with one side of each envelope omitted for simplicity. For example, if the datum 110 is assumed to be a positive 110 volt D.C. voltage, then the voltage appearing at terminal 106 when rectified is as illustrated by curve 112 while the voltage appearing at terminal 108 would be as illustrated by curve 114. As is apparent, the shape of the two curves are generally sinusoidal as are the curves 97 and 99 of FIG. 5. The difference between FIG. 5 and FIG. 6 is the bias voltage which separates the upper and lower halves of the signal pattern effected by the center tap resolver coupling subsequent rectification. By employing this technique a unique pair of voltages is available for each position within the 180° range of the resolver corresponding with the complete range of movement of the system. Without employing this technique there are four redundant voltages for each complete rotation of the resolver and two within the range of the machine. Thus, this technique approximately doubles the resolution of a given resolver. Furthermore, the machine responds predominantly to the voltage which has the greater slope at any given resolver position.

The output voltages appearing at terminals 106 and 108 are applied through shielded conductors to rectifier and doubler networks 116V, 116S and 116H. Again only the circuit details of rectifier and doubler network 116H are illustrated. It will be apparent that networks 116V and 116S are identically associated in the circuits for their respective modes or axes of operation. Each half of the resolver secondary is applied to the associated load and doubler circuit. Secondary terminal 106 is connected to a fixed load comprising resistor 128 and capacitor 130, and secondary terminal 108 is connected to a fixed load comprising resistor 142 and capacitor 144. Capacitors 130 and 144 are connected to the system ground 80.

Conductors 120 extend from point 166 in the voltage dividing network 118 and apply a D.C. voltage in the order of 112 volts through diodes 122 to the point in each rectifier network 116 between a doubler capacitor 124 and a diode 126. In each network, a capacitor 132 is connected from the negative terminal of the diode 126 to the system ground. This foregoing circuit functions as a signal rectifier and doubler whereby the 10 kc. variable amplitude signal, the positive peak value of which is shown in the chart of FIG. 6 as curve 112, is rectified to a D.C. potential having the same general amplitude relationship to resolver rotation. As is well understood, the doubler functions by charging the capacitor 124 on the negative half cycle, drawing current from the supply 118 through diode 122. On the positive half cycle of the voltage at terminal 106, the resolver output is effectively in additive series relationship with charged capacitor 124, whereby diode 122 is cut off, and a positive voltage substantially equal to twice the resolver output peak is applied through diode 126 to charge capacitor 132. Capacitor 132 is charged to a positive voltage above the datum of about 110 volts, the positive voltage depending upon the resolver position.

The other terminal 108 of the resolver secondary is connected in an identical manner to a second point 168 in the supply network 118. Conductor 134 is connected from point 168 which is at about 110 volts D.C. with respect to the system ground to the negative terminal of the diode 136. The voltage differential in the order of 2 volts between points 166 and 168 provides the necessary operating bias for diodes 122 and 136 so that the reference voltages in the two halves of the rectifier network 116 are substantialy equal. The positive terminal of diode 136 is connected to a point in the rectifier network 116 common to the negative terminal of a diode 138 and one terminal of a series capacitor 140. The terminal 108 of the resolver secondary is connected through load resistor 142 to the other terminal of the capacitor 140. The positive terminal of diode 138 comprises the doubler output and is also connected through an output capacitor 146 to the system ground 80. The manner in which this circuit functions will be apparent from the foregoing. Capacitor 140 is charged on the positive half cycle through diode 136. On the negative half cycle capacitor 146 is partially discharged through diode 138, the reduction in charge depending upon the magnitude of the resolver output and the charge on capacitor 146.

The negative terminal of diode 126 is connected to the limit control box 46 and is also connected through conductor 148 and normally closed contact 150 to the horizontal homing potentiometer 152H. The vertical and swing rectifier networks 116V and 116S have their upper positive output conductors similarly connected through normally closed contacts 154 and 156, respectively, to vertical homing potentiometer 152V and swing homing potentiometer 152S. The other or negative output of the horizontal rectifier 116H is the positive terminal of diode 138 which is connected to the limit control box 46, as will be described subsequently, and also through conductor 158 and normally closed contact 160 to the lower terminal of horizontal homing potentiometer 152H. The negative output conductors of vertical rectifier network 116V and swing rectifier network 116S are similarly connected through normally closed contacts 162 and 164 to the vertical and swing homing potentiometers 152V and 152S, respectively. The complete conductors to the homing potentiometers are not shown but are labelled X—X, Y—Y and Z—Z, respectively, for the vertical, swing and horizontal circuits.

Figures 7, 8:
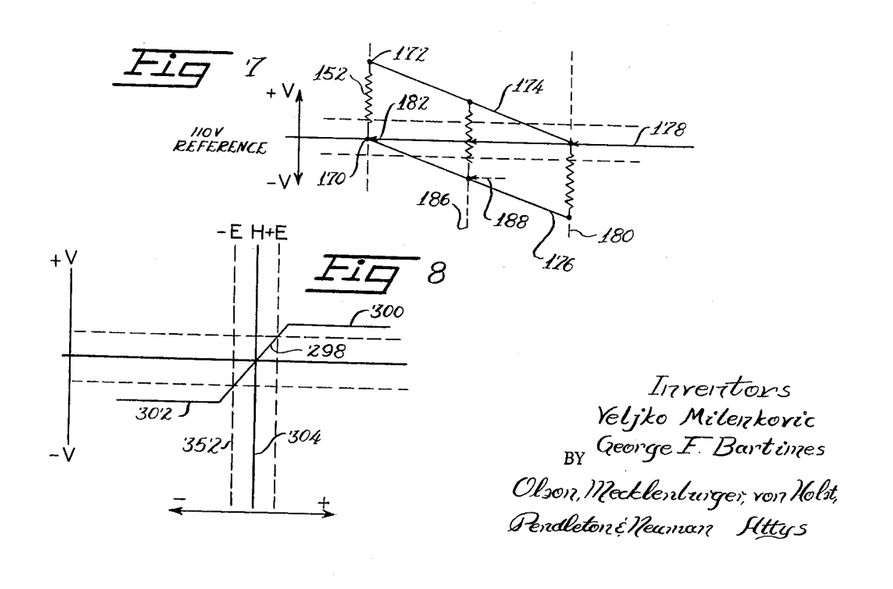
FIG. 7 is a diagrammatic chart illustrating the limit potentiometer operation of the circuit of FIG. 3.
FIG. 8 is a chart of the operating conditions for homing and limit control operation.

The voltages appearing at rectifier output terminals 170 and 172 reasonably approach straight line relationships with respect to the position of resolver 98 as it is rotated through 180°. This relationship is illustrated schematically in FIG. 7. The line 174 represents the voltage appearing at terminal 170 or across capacitor 132 for various positions of the resolver and the curve 176 represents the voltage appearing at terminal 172 or across capacitor 146. The abscissa 178 represents the reference voltage of substantially 110 volts. As will be apparent from FIG. 7 the curve 174 representing the voltage at terminal 170 varies from a maximum positive value approximately linearly with resolver rotation until at the minimum value the potential approaches the reference value. Conversely, at the left-hand extreme of resolver movement the potential at point 172 is substantially equal to the reference potential, and the potential at point 172 increases in the negative direction with resolver rotation until a maximum negative value is exhibited at line 180 where the potential at terminal 170 is at about the reference value. Thus, a unique combination of voltages appearing at the two rectifier terminals 170 and 172 exists for each position of the resolver through 180° of rotation, and these potentials are applied to the terminals of the corresponding homing potentiometers 152. The wipers 182 of potentiometers 152 are manually adjustable, and for each resolver position there is a corresponding position of the wiper 182 where the zero reference level will be sensed thereby. Thus, for each position of the machine in each mode, a unique voltage combination appears across the corresponding homing transformer; and as shown in FIG. 7, there is one unique manually set wiper position when the potentiometer output is at the reference level. Thus, if the potential at each of the wipers 182 is sensed and the machine is driven to reduce that potential to zero, a feedback system is provided in which the position of wiper 182 uniquely defines the home position of the machine in the corresponding mode. As a typical example, if the wiper in the horizontal mode is positioned at one end of potentiometer 152, as shown by broken arrow 188 in FIG. 7, and the resolver is at the position described by vertical line 186, then a negative error voltage equal to the displacement of arrow 188 below reference level 178 will be applied to the control system. This will extend the horizontal arm and rotate the resolver so that the resolver output will be shifted to the line 184 in FIG. 7. At this point the signal at wiper 182 will be zero.

The voltages appearing at terminals 170 and 172 are applied selectively either to the homing potentiometers or to similar potentiometers in limit control box 46. The manner in which selection is made between homing and limit control will be explained with reference to FIG. 4. As already described the horizontal homing potentiometer 152H, the vertical homing potentiometer 152V and the swing homing potentiometer 152S are similarly connected, and only the horizontal system is described in detail. The outputs of potentiometers 152 are taken at wipers 182V, 182S and 182H and applied to respective differential amplifiers 190. The voltage appearing at the wipers 182 will obviously depend upon two variables. The first is the mechanical position of the resolver which determines the potentials at terminals 170 and 172 and second the manually set position of the wiper 182. Thus, if the subsequent system is designed in the manner to be described so that the system is driven to a null value as sensed by the wipers 182, then manual rotation of wiper 182 will generate an error or off-null signal in the amplifiers and the control system energized thereby, whereby the particular mode of the machine 10 will be energized to drive the corresponding resolver 98 until the terminal voltages are proper and consequently the voltage at wiper 182 is again nulled as graphically demonstrated in FIG. 7.

It should be noted that this particular mode of operation which is the homing mode will only be desired at the end of a complete programming cycle in the manner already described above and in greater detail in pending application Serial No. 129,074. Near the end of a programming cycle the operator presses an appropriate button for homing and thereafter relinquishes further manual control over the operation of the machine. To initiate homing operation a relay contained in the basic sequence control system described in application Serial No. 129,074 is deactuated whereby the normally closed homing contacts are closed. It is preferred that relay coil 604 of application Serial No. 129,074 be employed for this purpose.

The manner in which the variable homing signal is applied to the control system will now be described. Again, while there are three modes of freedom for the machine 10, only the horizontal mode will be described in detail. The outputs at wipers 182V, 182S and 182H are applied to their respective differential amplifiers 190V, 190S and 190H. The maximum value of the variable voltage applied to the differential amplifier 190 is controlled by a pair of diodes 192 and 194 associated with each of the three modes. Each of the diodes 192 has its positive terminal connected to conductor 134 which is in turn connected to point 168 in the supply network 118. The negative terminals of diodes 194 are connected through conductor 196 to point 166 in network 118.

Each pair of the diodes 192 and 194 are connected in series with their common terminal connected to the corresponding potentiometer wiper 182. As point 168 is about 2 volts negative with respect to point 166, the diodes 192 and 194 are normally back-biased such that the diodes are not conductive and the voltage appearing at wiper 182 is applied to the input of the corresponding differential amplifier 190. In the event that the voltage excursion at the amplifier input resulting from rotation of the resolver 98 which in turn determines the voltage of potentiometer 152, or from movement of wiper 182 exceeds the back bias voltage on either diode 192 or 194, the diode becomes conductive and the signal from the homing potentiometer to the differentail amplifier 190 is automatically limited. Thus, typically, the voltage excursion available from the homing potentiometer 152 is in the order of plus or minus 1 volt. If the potential at wiper 182 should exceed a positive excursion of about 1 volt, diode 194 becomes conductive limiting the voltage at the wiper to that value. Conversely, if the voltage at wiper 182 experiences a negative excursion from the 110 volt reference level to a value of about 1 volt below the reference level, then the diode 192 becomes conductive and limits the value of the voltage excursion at wiper 182 to a value of about 1 volt below the reference.

The differential amplifiers 190 are of rather conventional design, although their use in the circuit and energization are quite unique. The differential amplifier 190 for each mode includes a pair of transistors 198 and 200 connected in a common emitter circuit. The emitters are connected together through separate emitter resistors 202 and 204 which are in turn connected to a grounded common emitter resistor 206. The collector of transistor 198 is connected through resistor 208 to one terminal of a potentiometer 210, the other terminal of which is connected through a resistor 212 to the collector of transistor 200. Potentiometer 210 is for balancing purposes and the wiper thereof is connected through a conductor 214 to the point 216 in the supply network 118. The voltage at point 216 is determined by the position of the wiper of potentiometer 218 which is in a direct series circuit from a source of positive D.C. potential at terminal 220. In the preferred embodiment of this invention, the voltage at terminal 220 is about +300 volts and the voltage at the wiper of potentiometer 218 would be in the order of 200 volts.

The base of transistor 200 in differential amplifier 190 is connected through a resistor 222 to the conductor 196 and thus is connected to the point 166 in supply network 118 which is maintained at a potential in the order of 112 volts. A similar base resistor 224 is connected from the base of transistor 198 to conductor 196 whereby transistors are normally biased for conduction in a linear range of operation. The wiper of potentiometer 210 is adjusted for approximately equal currents in the transistors 198 and 200. When a signal is applied to the base of transistor 198 from wiper 182 base current changes and emitter current in transistor 198 varies in direct relationship to the direction and magnitude of the voltage variation sensed by wiper 182. Thus, if wiper 182 becomes more positive, conduction through the base path of transistor 198 increases similarly increasing the current in the collector increasing the voltage drop across the common emitter resistor 206 and lowering the potential at the collector which is a signal output. This produces an effective change in the emitter current of transistor 200 which is a reduced current flow resulting from the increased voltage drop in resistor 206. Therefore, the collector current of transistor 200 is also reduced producing a voltage rise at the collector output of transistor 200 for a corresponding voltage drop at the collector output of transistor 198. Conversely, for a decreasing voltage at wiper 182 reduced current flows in the transstor 198 producing a voltage rise at its collector and increased current flows in transistor 200 producing a voltage decrease at its collector.

These output signals from the two collectors are applied through conductors 226 and 228 to the inputs of gates 230. Again, three identical gates are provided, a vertical gate 230V, a swing gate 230S and a horizontal gate 230H. The amplifier output conductors 226 and 228 are connected in parallel with the output conductors 232 and 234 of the limit control box 46. The limit control box 46 is shown in its entirety in FIG. 4 and will be described subsequently. However, the limit control box is inactive during manual operation and during the homing sequence of operation presently being described. Connected between the output conductors is a resistor 236 in series with normally closed contacts 238. The normally closed contacts 238 are indirectly controlled by the sequence control system already mentioned above and are closed whenever the contacts 150 and 160 of the homing potentiometer 152 are also closed. The resistor 236 which is effectively connected between the collectors of transistors 198 and 200 reduces the gain of the differential amplifier circuit when the system is in homing operation, and the contacts 238 are closed. Whenever the instant system is conditioned for manual control or manual control with limits, the contacts 238 are open and the gain increased thereby.

The variable D.C. control voltages from the collectors of transistors 198 and 200 are applied to the respective side of the gate 230 in such a manner that they charge corresponding filter capacitors 240 and 242. The outputs of the differential amplifier 190 are connected through diodes 244 and 246 to the positive terminals of the capacitors 240 and 242, the negative terminals being connected to the system ground 80. Resistors 246 and 248 are connected in parallel with the capacitors 240 and 242, respectively, for capacitor discharge. The output voltages appearing at capacitors 240 and 242 are directly applied through conductors 250 and 252 to the input terminals of a servo valve amplifier for controlling the hydraulic valves in the respective modes of the machine 10. Thus, the conductors 250 and 252 in the horizontal mode are connected to the input terminals of an amplifier forming a part of the horizontal servo valve system 76H. Similarly, the output conductors 250 and 252 of the vertical system are applied directly to the input terminals of an amplifier forming a part of the vertical servo valve system 76V, and conductors 250 and 252 of the swing system energize the swing servo valve system 76S. The valves in turn control the hydraulic systems which drive the machine.

As described above the machine 10 may be manually controlled in its three modes by the manipulation of a stick 24 (FIG. 1) mounted in a set of appropriate gimbals to energize three differential transformers 72V, 72S and 72H. These differential transformers are energized from the 10 kc. oscillator 40 through conductors 68 connected to network 118, conductor 70 connected to the oscillator and capacitors 254. The stick transformers have a D.C. system reference at point 75 in network 118 such that superimposed 10 kc. signals are applied to the conductors 250 and 252 through diodes 258 and 260 to differentially charge capacitors 240 and 242 and thus energize and drive the corresponding servo valve system 76. Whenever the 10 kc. signal is increased in either half of the transformer secondary as a result of movement of core 256 increased unilateral current will flow through the corresponding diode 256 or 260 charging capacitors 240 and 242, respectively. The choice of operation of the machine, that is, in either the homing sequence or the manual sequence (with or without limit control) is provided by a biasing technique principally controlled in network 118 by normally open contacts 244. In use, the homing sequence will usually be selected by an operator before a programming cycle is performed. That is, before a permanent record is made by tape recorders 38, the sequence control will be set to "home," and the knobs which control the three wipers 182V, 182S and 182H will be turned while the machine moves to the precise position which is selected as a home position. Under these conditions contacts 150, 154, 156, 160, 162 and 164 are closed energizing the homing potentiometers 152; contacts 238 are closed decreasing the gain of amplifier 190; and contacts 244 are open altering certain bias voltages. When contacts 244 are open as shown in FIG. 3, the potentials at points 166, 168 and 75 are so related that the quiescent potentials at the outputs of the amplifier 190 are higher than the maximum signal output from the stick transformers 72, and thus the potentials across capacitors 240 and 242 are determined solely by the homing signals applied through diodes 244 and 246. It is impossible to generate more positive signals by manipulation of the stick 24 such that the diodes 258 or 260 would be rendered conductive. At the end of a recording cycle, the operator releases stick 24 and the machine will automatically assume the home position free of control by the operator. This, of course, enables the use of a short program on a recorded tape with uninterrupted repetition of the cycle, each cycle beginning precisely where the last one ended. In the manual sequence, the sequence control opens contacts 150, 154, 156, 160, 162 and 164 de-energizing the homing potentiometers 152; the contacts 238 are opened increasing the gain of amplifier 190, and the contacts 244 are closed increasing the potential at point 75 and decreasing the potentials at the wiper of potentiometer 218. By the shift in the latter potentials, the D.C. bias on stick transformers 72 is raised so that the 10 kc. signals generated thereby will normally control the servo systems to the exclusion of the outputs from amplifiers 190. This is insured by the normal back biasing of diodes 244 and 246 as a result of the specified bias changes.

It is also desirable and fundamental to this system that during a programming cycle, it is possible to limit the motion of the machine under manual control to one octant of the total range of the machine, the octant being defined by three imaginary or electrical walls or limits as diagrammatically illustrated in FIG. 2. These walls or limits can be preset into the system so that an operator can quickly program one limit position to another with optimum speed and accuracy. This type of multiple limit control is attained through the gates 230 in conjunction with the limit control box 46 which will now be described while referring to FIGS. 3 and 4. The manner in which the 10 kc. oscillator 40 energizes the amplifier 94 which in turn energized the resolvers 98 to produce the signal illustrated in FIG. 6 has been adequately described. Also, the operation of the rectifier networks 116 to produce the voltage pattern as illustrated in FIG. 7 at limit box inputs 170 and 172 has also been described adequately above. Terminals 170 and 172 of the vertical rectifier system 116V are applied to input terminals 262V and 264V in FIG. 4. Similarly, the swing rectifier network 116S has its output applied to limit control box input terminals 262S and 264S, and the output of the horizontal rectifier network 116H is applied to the limit control box 46 at terminals 262H and 264H.

A sequencing system 265 for the various wall combinations is provided at the bottom of FIG. 4 and will be described in due course. A relay 266 is energized when either the operate switch 267 is in the "reset" position or the homing relay in the machine is actuated through conductor 269. Whenever the relay coil 266 in the sequence system 265 is de-energized the three sets of contacts 268 and 270 are deactuated to the normally closed position so that the outputs of the respective networks 116 are applied directly through the respective input terminals 262 and 264 in FIG. 4 to one of a set of limit potentiometers 272, 274 and 276. An eleven-position stepping switch including two wipers 278 and 280 selects the particular potentiometer from the group 272, 274 and 276 which is connected to the input terminals 262 and 264 at any given time. The wipers 278 and 280 engage a series of contacts 279 and 281 in a continuous sequence in response to energization of a stepping solenoid, and this provides the selection of one of a plurality of limits in the manner already set forth in general above. The wipers of potentiometers 272, 274 and 276 in each mode are connected together through a conductor 282 which is in turn connected to the output terminal 284 for the respective mode. The output terminals 284 are connected to conductors 286, shown at the bottom of the limit control box 46 in FIG. 3, which are in turn connected to the input conductors of the three differential amplifiers 190. Thus it may be seen that the output terminals 284 from the limit control box 46 are effectively applied in parallel with the output wipers 182 of the homing potentiometers 152 to the base inputs of the three differential amplifiers 190. Furthermore, the selected potentiometer 272, 274 or 276 when connected in the appropriate circuit by the various switching means functions in a manner somewhat similar to the homing potentiometer 152.

The voltages appearing on potentiometers 272, 274 and 276 are, of ocourse, the same rectified resolver output voltages appearing across the homing potentiometer 152 and are as shown in the chart, FIG. 7. Also each of the wipers of potentiometers 272, 274 and 276 are manually preset by an operator to define the particular desired sequence of limit positions of the machine 10 in the particular mode. However, because of the changes in bias on the stick transformers 72 and the differential amplifiers 190, the limit potentiometers do not exercise complete control over the machine but only control conjointly with the transformers 72. When the limit potentiometers are effective the relay contacts 244 which are controlled by the homing relay shown in application Serial No. 129,074 are closed placing resistors 286 in parallel with the lower half of potentiometer 218, resistor 288 and resistor 290. In a preferred embodiment of the invention, resistor 292 has a resistance value of about 12,000 ohms; potentiometer 218 has a resistance of about 2,000 ohms; resistor 290 has a resistance of about 4,000 ohms; resistor 286 is about 2,000 ohms; resistor 288, 2,000 ohms; and resistor 294 has a resistance of approximately 12,000 ohms. Thus, when the contacts 244 are closed, the potential at the wiper of potentiometer 218 which is normally about 195 volts is lowered slightly while the potential at point 75 is raised somewhat.

The potential at the wiper of potentiometer 218 is also the potential at point 216 and is consequently the voltage applied to the differential amplifier 190 through conductor 214. As this potential is lowered when contacts 244 are closed and the machine is placed in other than homing condition, the operating points of the differential amplifier 190 are also lowered correspondingly. Thus, the normal steady state potential at the collectors of transistors 198 and 200 are lower when the system is connected for manual operation or manual operation with limit control than when the system is conditioned for homing operation while the D.C. bias on the transformers 72 is raised. Consequently, the D.C. level of the input conductors 232 and 234 to the gate 230 is lowered by a carefully controlled predetermined voltage increment. At the same time, when contacts 244 are closed, the potential at conductor 68 is raised by a predetermined voltage increment whereby the D.C. level which is applied to the stick transformers 72 is also raised. The D.C. level which is applied to the primary winding of stick transformers 72 is coupled by the conductor 296 to the center tap of the secondary providing a predetermined D.C. level at the positive terminals of the diodes 258 and 260. While in homing operation the bias potentials in the circuit are so selected that the stick transformers 72 cannot produce voltage variations in conductors 250 and 252 sufficient to override the outputs of amplifier 190. The converse is true in manual or manual control with limits. Thus, the only control on the servo valves 76 during homing operation is that sensed by wiper 182 in the homing potentiometers 152.

In explaining manual operation with limit walls it will be first assumed that the collector voltage on differential amplifiers 190 is such that two walls exist simultaneously, a hypothetical which will be explained further below. In limited manual operation, the stick transformers 72 control the operation in a narrow range surrounding the null or zero error value as determined by the manual setting of the wiper of the selected limit potentiometer 272, 274 or 276. However, as the machine position departs substantially from the zero or null position, a substantial signal is applied from the wiper through conductors 282 and 286 to the differential amplifier 190.

The manner in which the joint control of the manual stick transformers 72 and the limit potentiometers operates may be better understood by referring to FIG. 8. The solid line 298 in FIG. 8 represents the response curve of voltage at the input to the base of transistor 198 plotted on the ordinate against mechanical deviation from an arbitrary center or zero value plotted on the abscissa. As already described, the relationship between displacement and voltage is substantially a straight line relationship for small errors of displacements. However, at the point where the error voltage would exceed the bias produced by the diode network including diodes 192 and 194, the diodes begin to conduct, and the curve is flat as indicated by portions 300 for positive error voltages and portion 302 for negative error voltages. When the system is set for homing operation, the servo valves 76 are automatically driven to correct for error voltage so that the mechanical system will rest along the H or home axis 304. Insofar as the limit system has been described, thus far, it would operate as a straight manual control machine within the range of positional displacement between the vertical lines —E and +E in FIG. 8. Because of the bias adjustments already described, the error voltages applied to either diode 244 or diode 246 in the gate 230 would be insufficient to produce forward bias in excess of the bias provided through diodes 258 and 260 from the stick transformers. However, if it is assumed that a positive voltage increase applied through diode 258 to charge capacitor 240 produces a positive displacement of the machine in that particular mode, then that positive displacement will produce a corresponding positive error voltage, as indicated in FIG. 8. This positive error voltage from the limit potentiometer 272 is applied through conductors 282 and 286 to the input of amplifier 190 causing a positive voltage excursion at the collector of transistor 200. As the collector potential of transistor 200 becomes more positive, it alters the bias on diode 246 until the collector voltage on line 228 exceeds the lower side voltage of the stick transformer 72 which is applied to the negative terminal of diode 246 through diode 260. Thus, diode 246 is rendered conductive, and the positive going potential at the collector of transistor 200 becomes the D.C. potential across capacitor 242 where it is compared with the potential across capacitor 240, and the voltage difference therebetween determines the operation of the servo system 76. When the mechanical displacement is equal to +E in FIG. 8, then the potential across capacitors 240 and 242 are equal, and the system cannot be driven further in the positive direction. However, the stick 24 can be used to retract the machine from the limit or electrical wall at +E and regains full control in the range between +E and —E. The system operates identically if the stick is oppositely manipulated to drive the machine in a negative direction. Then the stick transformer 72 charges the capacitor 242; and as the machine moves, the resolver 98 and limit potentiometer 272 generate a balancing error voltage which charges capacitor 240 until the maximum negative mechanical displacement —E is reached, where a balance is reached between the charges on capacitors 240 and 242, and the differential transformer 72 is rendered ineffective.

The foregoing is a hypothetical explanation of the gating operation as the system is designed to operate without limit in one direction up to the limit of the machine range, while having a single imaginary wall, either the +wall or the —wall. By limiting each mode to a single barrier or wall and providing free movement in the other direction within the mode, the octant of operation described with respect to FIG. 2 is attained. The switching system which will be described with respect to the central portion of FIG. 4 limits the area of operation to only one of the octants.

In the pre-programming set up of the machine, the operator knows the octant from which he will approach the selected limits and appropriate switches in the limit control box 46 are positioned. Specifically, in FIG. 4, switches 306, 308 and 310 are provided for each of the three modes of operation. These correspond to the potentiometers 272, 274 and 276, respectively, and are placed in a control circuit by another set of stepping switch wipers 312. In each of the three modes, if the switch 306 is thrown to the up position, the positive quadrant is selected. If the switch 306 is thrown to the lower position, the negative quadrant is selected. And, if the switch 306 is centrally disposed, in the off position, then no limit control is provided in that mode and normal manual control throughout the entire range of the machine is available in that specific mode. If normal manual control throughout the entire range of the machine is desired, that may be attained by centrally positioning each of the three switches 306, or it may be more easily accomplished by incapacitating the limit control box 46 entirely by either placing the operation switch at "reset" or programming manual operation through the stepping switch.

For convenience, the number of potentiometers and switches in FIG. 4 has been limited so that only three potentiometers 272, 274 and 276 are shown for each of the three operating modes of the machine. Similarly, three corresponding three-position switches 306, 308 and 310 are illustrated for each of the three operating modes of the machine. However, it will be clear that in the particular embodiment described an eleven-position stepping switch is provided, and thus up to eleven potentiometers might be inserted for eleven different possible walls or limit controls. Also, where it is known from the program that a certain duplication of predetermined positions will be desired during a complete operating cycle, jumpers 314 and 316 may be employed to effectively place a given potentiometer such as potentiometer 272 at a second point in the stepping cycle. Similarly, a jumper 318 may be employed in each of the switching banks to provide multiple use of any given three-position switch such as switch 306. The switches and potentiometers can be reused in any desired combination as will be apparent.

A single imaginary or electrical wall is created to limit the effective range of the machine in each of the three modes by a circuit from a 300 volt positive supply 320 through normally closed contacts 322 and 324, large resistor 326 and wiper 312 of the stepping switch to the three pole switches 306, 308 or 310. The wiper 312 successively engages the series of contacts 328, which are in turn connected to the movable switch portion of the switches 306, 308 and 310. The fixed switch contacts are connected to large variable resistors, the upper contact of each switch being connected through a variable resistor 330 to a bus 332 and the lower contact being connected through a variable resistor 334 to a bus 336. The buses 332 and 336 are connected to the negative terminals of identical diodes 338 and are also connected to terminals 340 and 342. There are a pair of terminals 340 and 342 for each of the three modes of operation, and thus the terminals 340V and 342V are connected through conductors 232 and 234 to the vertical gate 230V; the terminals 340S and 342S are connected to conductors 232 and 234 of the swing circuit which in turn are connected to the swing gate 230S; and the terminals 340H and 342H are connected to conductors 232 and 234 which in turn are connected to the horizontal gate 230H, all as seen by a comparison of FIGS. 3 and 4.

In switching to manual operation, contacts 244 lower the supply voltage on amplifier 190 so that no walls would be present without alternate collector voltage sources. Referring back to FIG. 4, the positive terminals of each of the diodes 338 are connected to a common source of positive direct current potential in the order of 115 volts. The voltage at terminal 344 is about 115 volts as provided at point 346 in the network 118 and is slightly positive with respect to the reference voltages and with respect to the voltage at the wiper of potentiometer 214 in the differential amplifiers 190. However, this level is below the range of the stick transformers so that operation of the servo systems is unaffected thereby. Resistors 348 and 350 as well as all of the other components of the voltage supply network 118 are so selected that the potential at point 346 and consequently the potential applied through conductor 344 to the diodes 338 is stable at a level slightly below the potential at which the stick transformers 72 are maintained and is locked there through the forward bias on diodes 338.

When one of the wall direction switches 306, 308 or 310 is thrown to the upper position, the 300 volt D.C. potential available at terminal 320 is applied through the wiper 312 of the stepping switch through the switch such as switch 306 and through the variable resistors 330 to the bus 332. Resistors 326 and 330 are relatively large, being in the order of 300,000 ohms, and a circuit is completed through these resistors to the collector of the selected transistor 198 or 200 and in turn to the power supply at point 216 through the collector resistors. This removes the locking potential appearing at the collector of one of the transistors 198 or 200 by back-biasing the appropriate diode 338 and raising the collector voltage. The collector of the remaining transistor, either transistor 200 or 198, remains locked by the corresponding diode 338 so that only one transistor is operative and consequently only one wall exists.

The locked potential determined by the switching circuit of FIG. 4 and the voltage at point 346 is above the normal potential of the collectors but sufficiently low so that the particular biased side of the gate 230 is free to respond to the output of the manual stick transformer 72 irrespective of the range of movement of the machine or the degree of displacement of the transformer 72. However, the potential at the other collector of the differential amplifier 190 is biased at a higher level by the control box and is determined by the wiper position of potentiometer 272 and the resolver relationship. Thus, one of the pair of walls described above in the hypothetical case is removed by the lower bias from diode 338 giving free movement within the octant but one wall is provided by the closed switches 306.

To fully realize the benefits of the electrical walls for accurately positioning the machine 10, it is necessary to provide means for quickly changing the limit settings during a programming operation. This is accomplished through the stepping circuit 265 shown at the bottom and right side of FIG. 4. The circuit includes a set of relays, two stepping switches and a matrix of push button switches which are alternately opened and closed by successive depressions. In the matrix 356 of switches 354 there are one hundred and twenty one switches arranged in eleven columns and eleven rows. When a given switch, such as switch 354a, is depressed, the contacts are open and the automatic stepping system will rest in that position pending a further manual command. As the switch 354a is in the top row of the stepping sequence, all of the wipers associated with that stepping switch, that is, all of the wiper and contact combinations shown vertically disposed in FIG. 4, will dwell in the top position. These include the wipers 278 and 280 associated with each of the limit potentiometer groups for the three modes, wipers 312 associated with each of the banks of three position switches for wall polarity control in each of the three modes, a wiper 358 which sequentially engages eleven contacts 360 to energize lights 362, and a wiper 364 which sequentially engages contacts directly connected to each of the rows 366 of contacts 354. Multiple bank stepping switches of this type are well known and are sometimes referred to as telephone or step-by-step switches. The wipers 278, 280, 312, 358 and 364 are driven together on a common support by solenoid winding 368.

A second stepping switch includes eleven wipers 370, each associated with one set of eleven contacts 372. As will be explained, each time the first stepping switch, which will be designated the "A" stepper, completes one cycle, it actuates the solenoid 374 of the second stepper, hereinafter designated the "B" stepper, shown including a series of horizontal contacts 372 in FIG. 4, so that the various switches 354 are sensed in order, one column at a time, until the cycle is completed. The stepping circuit will cause rapid automatic stepping until an open switch 354 is sensed and the system will then rest until an additional manual command is received. Most of the switches and wiring in the switch matrix 356 are omitted in FIG. 4 for simplicity as the wiring is quite obvious from that portion included in the drawing. The top row of contacts 372t, in addition to completing circuits to the top row of switches 354, also selectively energizes one of the lights 376 indicating the position of the stepper.

The operation of the control circuit for the stepping switches will now be described. When the machine 10 is initially placed in operation, the "operate" switch 267 is placed in the upper or "reset" position. This energizes relay coil 266 through a circuit from a 110 volt D.C. terminal 378 through conductor 380, conductor 382, and switch 267 to ground. Energization of relay coil 266 opens all of the contacts 268, 270, 322, and 384; contacts 268 and 270 removing the resolver signal from the limit potentiometers, contacts 322 removing the 300 volt D.C. potential from the three position switches, and contacts 384 de-energizing relay coil 386 shown in FIG. 3. De-energization of relay coil 386 closes normally closed contacts 150, 154, 156, 160, 162, 164 and 238 to place the system in the homing sequence as already described.

Placing the "operate" switch in the "reset" position also closes a switch 388 which causes both stepping solenoids 368 and 374 to cycle to the eleventh or normal position where they will rest until manually actuated. This is accomplished in the following manner. A circuit is completed from the system ground 80 through conductor 390, closed switch 388, conductor 392, closed B interrupter contacts 394 which are opened each time the B stepper is energized, closed B off-normal contacts 392 which are open whenever the B stepper is off of its normal or eleventh position, B winding 374, and conductors 396 and 380 to the 110 volt D.C. supply 378. Thus if the B stepper is in other than its normal position, it is actuated through this circuit and each time it is actuated, B interrupter contacts 394 de-energize the B winding 374, causing intermittent stepping operation until at the normal position contacts 392 are opened.

When the B stepper reaches the normal position, B off-normal contacts 398 are closed which completes the following circuit: From ground 80 through conductors 390 and 392, B off-normal contacts 398, A off-normal contacts 400, A interrupter contacts 402, A off-normal contacts 404, A coil 368 and conductors 396 and 380 to the D.C. terminal 378. It should be noted that all interrupter contacts are shown in the de-energized position and all off-normal contacts shown in the position when the respective stepper is off of its normal or eleventh position. Thus the circuit just traced energizes the A winding 368 if the A stepper is off normal. The circuit is immediately broken by A interrupter contacts 402 producing intermittent operation until the A stepper reaches the normal position where A off-normal contacts 404 are opened and the stepper rests. In the normal position the wipers 312 engage open contacts and thus when the machine is conditioned for manual operation no walls will be present. The machine 10 is conditioned for operation by actuating the "operate" switch whereby the switches 267 and 388 are moved to the lower position. If the sequence system 42 is set for homing, a potential is applied from the homing relay in the sequence system to maintain relay coil 266 energized.

Upon de-energization of winding 266 the system is subject to manual operation with or without limit control. If limit control is desired, the potentiometers 272, 274 and 276 will be preset, as already explained. If only three sets of walls are desired for a given program, the potentiometers may be preset in order and the first three buttons depressed in the left hand column of the switch matrix 356. However, if the operator required additional walls or limits, then additional potentiometers would be needed. Also, if in the program the same positions were repeated two or more times, then the same potentiometers may be reused through the switch matrix 356. For example, if the operator wished to go from position A to B to C to B to A, he would set up the positions A, B and C in potentiometers 272, 274 and 276, respectively, and in switches 306, 308 and 310, respectively. Then in the matrix he would depress the three uppermost buttons in the first column, the second button in the second column, and the third button in the third column, giving him the desired sequences. Many other possibilities will immediately appear.

The sequencing is accomplished in the following manner. When the operator wishes the first set of walls or limits, he depresses either the button 406 on the machine column or the push button 408 on a hand held control. Either completes a circuit from ground 80 through conductor 390, contacts 406 or 408, normally closed contacts 410, A interrupter contacts 402, normally open A off-normal contacts 412, B winding 374, and conductors 396 and 380 to D.C. terminal 378. Thus B stepper winding 374 is energized moving the wipers 370 from the position shown to the first position to the left. At the same time the B interrupter contacts 414 are momentarily closed, completing the circuit through A winding 368 and causing it to step to the first position off normal.

Energization of A winding 368 performs another important function. A interrupter contacts 416 are closed momentarily which energizes a holding relay winding 418 which removes power from the polarity switches by opening contacts 324 whereby erratic operation is avoided during switching. Energization of winding 418 also closes contacts 420 holding winding 418 energized, and opens contacts 410 to de-energize both A winding 368 and B winding 374 even though one of the push buttons 406 or 408 may remain depressed. Resistor capacitor networks 422 merely act as contact protection. However, network 424 has a relatively long time constant so that multiple stepping which occurs when the system is hunting for an open switch 354 in matrix 356 will not result in chatter or intermittent operation of relay 418.

If after the initial stepping operation of the A and B steppers as described above the system sees a closed switch 354, then the A stepper will continue to operate in the following manner. Opening of contacts 410 de-energizes A winding 368 closing contacts 402. If the sensed switch 354s is closed, a circuit is completed from the D.C. supply 378 through conductors 380 and 396, A winding 368, contacts 404 and 402, conductors 426 and 428, wiper 364, switch 354, contact 372t, wiper 370 and conductors 430 and 432 to ground 80. If the A stepper completes a cycle, returning to normal without sensing an open switch, then the following circuit is completed. From the D.C. terminal 378 through conductors 380 and 396, B winding 374, A off-normal contacts 412, conductors 426 and 428, wiper 364, switch 354, contacts 372, wiper 370 and conductors 430, 432 and 390 to ground 80. Energization of the B winding 374 actuates B interrupter contacts 414 to energize the A winding 368 and continue the sequence. Thus any combination of potentiometers and polarity switches may be employed limited only by the physical equipment available and the needs of the particular program. Furthermore, while the sequencing system just described has many advantages when employed with the limit control system, it will be apparent that each has wide application alone. In particular it will be apparent that the sequencing system may be employed for any selection of controls or phenomena which can be electrically inserted into the system. This system provides programming versatility which was not heretofore available.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. Apparatus for controlling the position of a movable element comprising motive means moving said element within a predetermined range of positions, manual means for manipulating said element to any desired position within said range, signal means interconnecting said motive means and said manual means and generating signals related in magnitude and polarity to the degree of manipulation of said manual means up to a maximum magnitude, said motive means being responsive to the magnitude and polarity of said signals and operative in response thereto, homing means adapted to generate a variable pattern of signals uniquely defining said range of positions and an adjustable home position for said element, limit means adjustable within said range of positions to any predetermined position and adapted to generate a limit signal when said element is at said predetermined position which effectively isolates said signal means from said motive means whereby said motive means cannot move said element through said predetermined position, and means selectively connecting said homing means, said signal means, or said signal means and limit means to said motive means.

2. Apparatus for controlling the position of a movable element comprising motive means moving said element within a predetermined range of positions, manual means for manipulating said element to any desired position within said range, signal means interconnecting said motive means and said manual means and generating signals related in magnitude and polarity to the degree of manipulation of said manual means up to a maximum magnitude, said motive means being responsive to the magnitude and polarity of said signals and operative in response thereto, homing means adapted to generate a variable pattern of signals uniquely defining said range of positions and an adjustable home position for said element, a plurality of limit means adjustable within said range of positions to any predetermined position and adapted to generate a limit signal when said element is at said predetermined position which effectively isolates said signal means from said motive means whereby said motive means cannot move said element through said predetermined position, selector means associated with each of said limit means selecting a portion of said range of positions between one or the other extreme thereof and said preset limit and limiting operation of said element to positions within said portion of said range of positions, and means selectively connecting said homing means, said signal means, or said signal means and one of said selector means and limit means to said motive means.

3. The apparatus of claim 1 including a plurality of said limit means, and sequencing means for sequentially applying selective ones of said limit means to said motive means.

4. The invention defined in claim 2 including means sequentially connecting each of said selector means and said limit means to said motive means.

5. The apparatus of claim 4 wherein said motive means is a solenoid controlled hydraulic system, said signals are electrical and said manual means generates said electrical signals directly related to the degree of manipulation thereof.

6. The apparatus of claim 5 wherein said homing means generates an electrical signal directly related in polarity and magnitude to the displacement of said element from a predetermined home position, and said limit means generates a signal related to the position of said element and having a magnitude corresponding to the maximum signal from said manual means when said element is in said predetermined position.

7. The apparatus of claim 3 wherein said homing means generates an electrical signal directly related in polarity and magnitude to the displacement of said element from a predetermined home position, and said limit means generates a signal related to the position of said element and having a magnitude corresponding to the maximum signal from said manual means when said element is in said predetermined position.

8. Apparatus for controlling the position of a movable element in three generally orthogonally related modes comprising motive means moving said element within a predetermined range of positions in each of said modes, manual means for manipulating said element to any desired position within the range of each of said modes, signal means interconnecting said motive means and said manual means for each of said modes and generating signals related in magnitude and polarity to the degree of manipulation of said manual means in each of said modes up to a maximum magnitude, said motive means being responsive in each of said modes to the magnitude and polarity of said signals and operative in response thereto, homing means adapted to generate a variable pattern of signals in each of said modes, said signals uniquely defining said range of positions for each mode and defining a home position for said element, limit means for each mode adjustable within said range of positions to define a predetermined position and adapted to generate a limit signal whereby said motive means cannot move said element through said predetermined position and is thereby limited to movement within an octant defined by said predetermined positions, and means in each mode selectively connecting said homing means, said signal means, or said signal means and limit means to said motive means.

9. Apparatus for controlling the position of a movable element in three generally orthogonally related modes comprising motive means moving said element within a predetermined range of positions in each of said modes, manual means for manipulating said element to any desired position within the range of each of said modes, signal means interconnecting said motive means and said manual means for each of said modes and generating signals related in magnitude and polarity to the degree of manipulation of said manual means in each of said modes up to a maximum magnitude, said motive means being responsive in each of said modes to the magnitude and polarity of said signals and operative in response thereto, homing means adapted to generate a variable pattern of signals in each of said modes, said signals uniquely defining said range of positions for each mode and defining a home position for said element, a plurality of limit means for each mode adjustable within said range of positions to define a predetermined position and adapted to generate a limit signal whereby said motive means cannot move said element through said predetermined position and is thereby limited to movement within an octant defined by said predetermined positions, selector means associated with each of said limit means selecting a portion of said range between one or the other extreme thereof and said predetermined position and limiting operation of said element in each mode to positions within said portion of said range of positions, and means in each mode selectively connecting said homing means, said signal means, or said signal means and one of said selector means and said limit means to said motive means.

10. The apparatus of claim 9 wherein a plurality of limit means and a corresponding plurality of selector means are associated with each of said modes, and sequencing means for sequentially applying each of said limit means and said selector means to said motive means.

11. Apparatus for controlling the position of a movable element comprising motive means moving said element within a predetermined range of positions in response to electrical signals applied thereto, manual means for manipulating said element to any desired position within said range, means generating an electrical control signal in response to manipulation of said manual means, said electrical control signal being directly related in magnitude up to a predetermined maximum magnitude and in polarity to the degree and direction of said manipulation respectively, adjustable limit means comprising a variable electrical limit signal source varying in accordance with the position of said element and adjustable to provide a predetermined signal value for each position of said element, means connecting said control signal to said motive means, means comparing said control signal and said limit signal, gate means energized by said limit signal and isolating said control signal from said motive means whenever said limit signal has a signal value corresponding to a desired limit position, and switch means selectively rendering said gate means effective.

12. Apparatus for controlling the position of a movable element comprising motive means moving said element within a predetermined range of positions in response to electrical signals applied thereto, manual means for manipulating said element to any desired position within said range, said manual means including an electromechanical transducer adapted to generate an electrical control signal in response to manipulation of said manual means and directly related in magnitude and polarity to the degree and direction of said manipulation respectively, up to a predetermined maximum magnitude, sensing transducer means generating a variable electrical signal related to the instantaneous position of said element, manually adjustable limit means energized from said sensing transducer and adapted to produce a limit signal therefrom related to said variable electrical signal and having a limit signal value at a predetermined and preset limit position effectively equal to said maximum magnitude of said electrical control signal, gate means comparing said control signal and said limit signal and isolating said control signal from said motive means whenever said limit signal has a signal value corresponding to said maximum magnitude, and switch means selectively rendering said gate means effective.

13. The apparatus of claim 12 wherein a plurality of manually adjustable limit means are energized from said sensing transducer, each adapted to produce a different limit signal from said variable electrical signal and having a limit signal value at a preset limit position effectively equal to said maximum magnitude of said electrical control signal, gate means, switch means selectively applying any one of said limit means to said gate means, said gate means comparing said control signal and the selected limit signal and isolating said control signal from said motive means whenever said selected limit signal has a signal value corresponding to said maximum magnitude.

14. The apparatus of claim 13 including stepping switch means to sequentially apply one of said limit means to said gate means and manual control means to actuate said stepping switch means.

15. The apparatus of claim 13 including stepping switch means to sequentially apply one of said limit means to said gate means, said switch means selectively rendering said gate means effective and actuating said stepping switch means each time said gate means is rendered ineffective.

16. The apparatus of claim 12 including selector means selecting a portion of said range between one or the other extreme thereof and said preset limit position and limiting operation of said element to positions within said portion of said range of positions.

17. The apparatus of claim 13 including a selector means associated with each of said limit means, each selector means selecting a portion of said range between one or the other extreme thereof and said predetermined position and limiting operation of said element to positions within said portion of said range, said switch means selectively applying any one of said limit means and the associated selector means to said gate means, said selector means being manually actuated to select the portion of the range defined by either said one extreme or said other extreme.

18. The apparatus of claim 17 including stepping switch means to sequentially apply one of said limit means and the associated selector means to said gate means, said switch means selectively rendering said gate means effective and actuating said stepping switch means each time said gate means is rendered ineffective.

19. The apparatus of claim 17 wherein said switch means comprises a plurality of self-holding actuatable switch means each including a plurality of switches, each of said actuatable switch means being associatable with one of said limit means and the related selector means, and having an auxiliary switch, scanning means adapted to electrically scan said plurality of switch means, means to interrupt said scanning means when an actuated switch means is scanned through said auxiliary switch, means controlled by said switch means to thereafter operatively connect the associated limit means and selector means to said gate means, and manual means to initiate said scanning means.

20. In apparatus for controlling the position and operation of a movable element comprising motive means connected to move said element, manual control means operatively connected to said motive means for control thereof, and an auxiliary system for sequentially controlling the position and operation of said movable element comprising a plurality of means for controlling the position and operation of said movable element, a plurality of self-holding actuatable devices each adapted to control one of said plurality of means and having auxiliary means responsive to actuation thereof, scanning means adapted to scan said plurality of devices sequentially, means to interrupt said scanning means when an actuated device is scanned through said auxiliary means, means controlled by said actuated device to thereafter operatively connect the associated one of said plurality of means to control the position and operation of said movable element, said associated one of said plurality of means being effective irrespective of the operation of said manual control means.

21. Apparatus for controlling the position of a movable element comprising motive means moving said element within a predetermined range of positions in response to electrical signals applied thereto, manual means for manipulating said element to any desired position within said range, means generating an electrical control signal in response to manipulation of said manual means, said electrical control signal being directly related in magnitude up to a predetermined maximum magnitude and in polarity to the degree and direction of said manipulation respectively, adjustable limit means comprising a variable electrical limit signal source varying in accordance with the position of said element and adjustable to provide a predetermined signal value for each position of said element, means connecting said control signal to said motive means, comparing means comparing said control signal and said limit signal and isolating said control signal from said motive means whenever said limit signal has a signal value corresponding to a desired limit position, said latter means comprising a two-terminal balanced output circuit operatively connected to said motive means, balanced electrical inputs from said means generating electrical control signals, unilaterally conductive means connecting respective inputs to the terminals of said output means, said variable electrical limit signal source comprising a two-terminal balanced input for said comparing means, and unilaterally conductive means connecting respective terminals of said limit signal source and said two-terminal balanced output, said unilaterally conductive means being connected in said circuit with a common polarity.

22. Apparatus for controlling the position of a movable element comprising motive means moving said element within a predetermined range of positions in response to electrical signals applied thereto, manual means for manipulating said element to any desired position within said range, means generating an electrical control signal in response to manipulation of said manual means, said electrical control signal being directly related in magnitude up to a predetermined maximum magnitude and in polarity to the degree and direction of said manipulation respectively, adjustable limit means comprising a variable electrical limit signal source varying in accordance with the position of said element and adjustable to provide a predetermined signal value for each position of said element, means connecting said control signal to said motive means, comparing means comparing said control signal and said limit signal and isolating said control signal from said motive means whenever said limit signal has a signal value corresponding to a desired limit position, said latter means comprising a two-terminal balanced output circuit operatively connected to said motive means, balanced electrical inputs from said means generating electrical control signals, unilaterally conductive means connecting respective inputs to the terminals of said output means, said variable electrical limit signal source comprising a two-terminal balanced input for said comparing means, unilaterally conductive means connecting respective terminals of said limit signal source and said two-terminal balanced output, said unilaterally conductive means being connected in said circuit with a common polarity, and manually controlled selector means comprising a bias voltage source for said limit signal source selectively applicable to one of the two terminals thereof to effectively isolate said one terminal from said motive means.

References Cited by the Examiner

UNITED STATES PATENTS

| | | | |
|---|---|---|---|
| 2,475,245 | 7/1949 | Leaver et al. | 318—162 |
| 2,537,770 | 1/1951 | Livingston et al. | 318—162 |
| 2,677,085 | 4/1954 | Sikorra | 318—144 X |
| 2,717,979 | 9/1955 | Gardiner | 318—162 X |
| 2,751,542 | 6/1956 | Woodward | 323—9 X |
| 2,866,145 | 12/1958 | Peaslee et al. | 318—162 |
| 2,939,287 | 6/1960 | Capron et al. | 318—39 X |
| 2,976,430 | 3/1961 | Sander | 307—88.5 |
| 3,011,071 | 11/1961 | Edwards | 307—88.5 |
| 3,035,214 | 5/1962 | Kelling | 318—162 X |
| 3,138,750 | 6/1964 | Borger et al. | 318—162 |

FOREIGN PATENTS 982,389   6/1951   France.

ORIS L. RADER, *Primary Examiner.*